Aug. 22, 1933.　　　D. F. SPROUL　　　1,923,894
CUSHIONING DEVICE
Filed Sept. 19, 1931
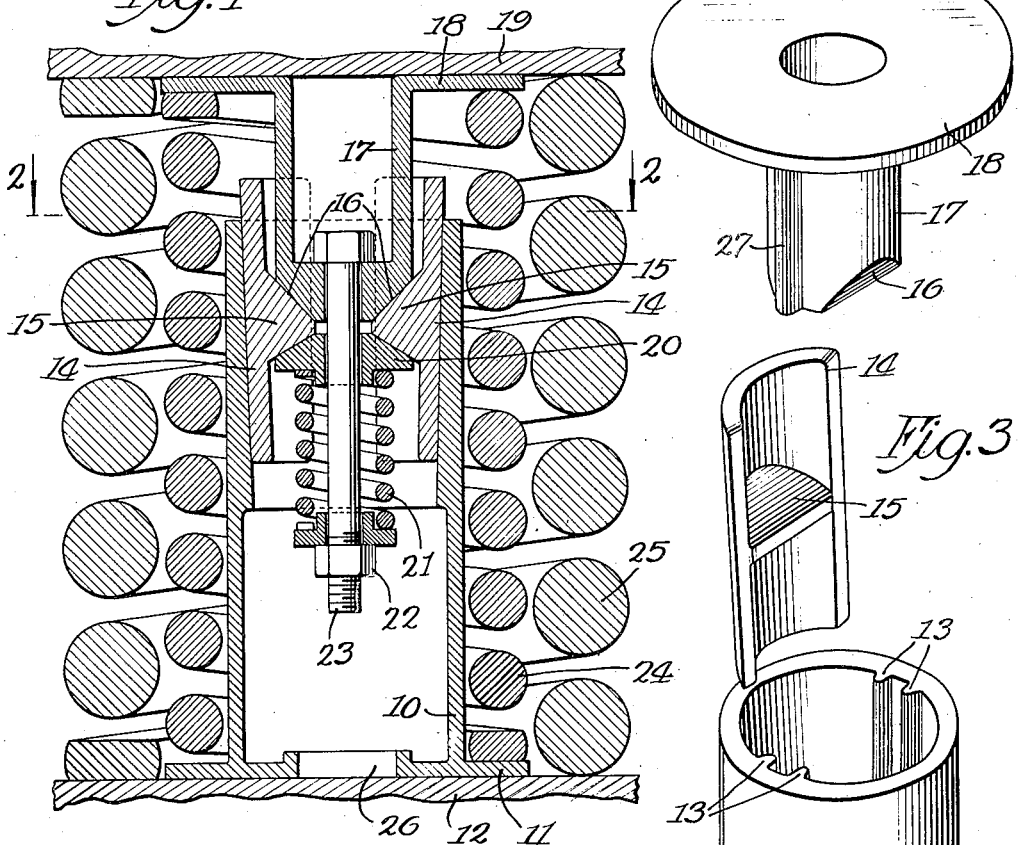
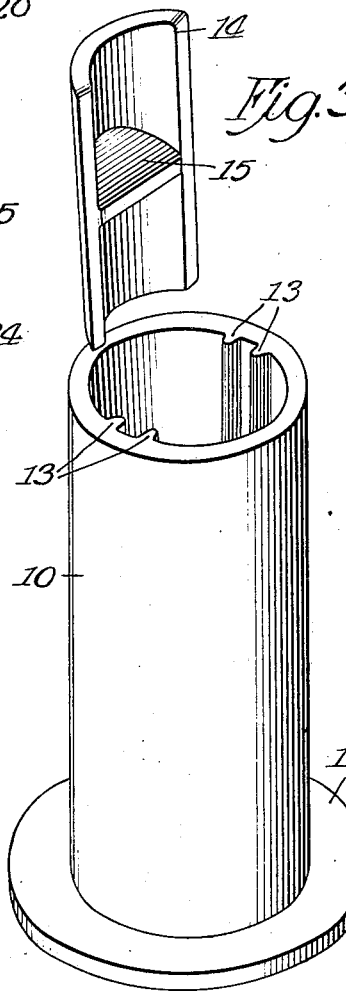
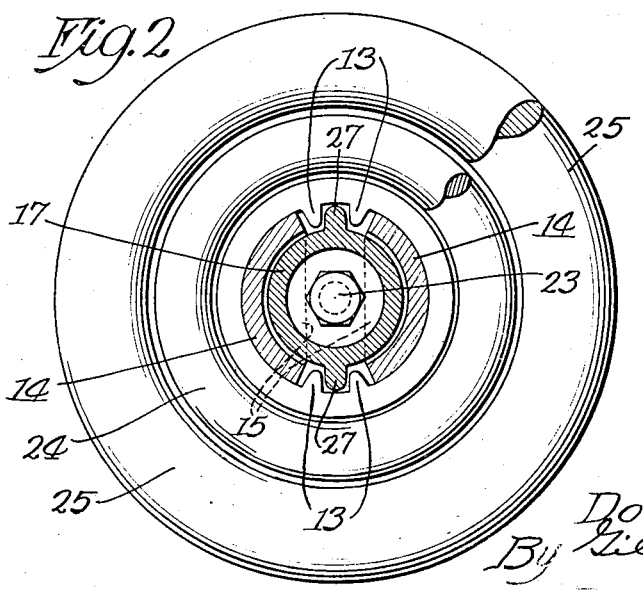
Inventor:
Donald F. Sproul Patented Aug. 22, 1933

1,923,894

UNITED STATES PATENT OFFICE 1,923,894

CUSHIONING DEVICE

Donald F. Sproul, Chicago, Ill., assignor to Cardwell Westinghouse Company, a Corporation of Delaware Application September 19, 1931
Serial No. 563,729

3 Claims. (Cl. 267—9)

The invention relates to cushioning devices of the friction type and in the disclosed embodiment is especially adapted for the support of car bolsters.

Among the objects of the invention are the securing of efficiency and smoothness of action and also to provide for the easy adjustment of the device to adapt it to the load it will be required to support.

In the drawing—

Fig. 1 is a central longitudinal section of the device as applied to a car;

Fig. 2 is a sectional view on the line 2—2 of Fig. 1; and

Fig. 3 is a group of the friction elements shown in perspective.

The improved device comprises a cylindrical casing 10 having lateral foot flanges 11 for resting upon a support 12. The upper end of the casing is open and its inner walls flare toward such end, at least on two sides of the cylinder. The casing is further provided with oppositely disposed longitudinal guide ribs as 13. A pair of segmental friction shoes 14 cooperate with the inclined walls of the cylinder, each of these shoes being formed with wedged blocks 15 on its inner side. With these wedged blocks, there cooperate similar wedge faces 16 formed on an inwardly projecting hollow stem 17 of a follower 18 which is adapted to support at least in part a car bolster indicated at 19.

A spring seat 20 bears upwardly against the wedged blocks 15 and is supported by a helical spring 21 reacting against a nut 22 in threaded engagement with a bolt 23 which extends axially through the chamber of the follower extension 17 and is carried thereby.

A helical spring 24 reacts between the foot flange 11 of the casing and the follower 18 and contributes to the support of the load and functions to restore the friction elements to normal position after compression.

An outer helical spring 25 is shown as interposed between the bolster 19 and the support 12 and carries a portion of the load, without, however, modifying the action of the friction device already described.

Upon the application of the device, the spring 21 is put under tension by adjusting the nut 22, to which access is gained through an aperture 26 in the closed end of the casing 10.

This spring tension causes the application of spreading wedging forces to the shoes 14 and consequently holds them under pressure against the casing walls. Upon the compression of the device by the downward movement of the bolster 19, the shoes 14 are moved downwardly and forced inwardly by reason of the inclination of the inner walls of the casing. This inward radial movement of the shoes forces the spring seat 20 downwardly against the resistance of the spring 21 and this action is facilitated by giving the contacting faces of the wedged blocks 15 and spring seat 20 wedging faces having an obtuse angular relation to the axis of the device.

Upon relief of the compressing forces, the parts are restored to normal position by the action of the spring 24. Relative turning movement of the wedge and friction elements is prevented by the engagement with guide ribs 13 of complementary longitudinal ribs 27 formed longitudinally on the stem 17 of follower 18.

What I claim, therefore, is:

1. In a cushioning device, in combination, a cylindrical casing having a lateral flange at its closed end and being inwardly tapered from its open end, segmental friction shoes engaging the tapered walls and having outward facing wedge surfaces on their inner faces, a follower having wedge faces cooperating with the wedge surfaces of the shoes, an axial rod anchored to the follower and extending into the casing, a nut threaded upon the inner end of the rod, a spring seat bearing outwardly against the shoes, a spring reacting between the seat and the nut and a helical spring reacting between the casing flange and the follower.

2. In a cushioning device in combination a cylindrical casing having a lateral flange at one end and being inwardly tapered from its opposite open end, segmental friction shoes engaging the tapered walls and having outwardly facing wedge surfaces on their inner faces, a follower having wedge faces cooperating with the wedge surfaces of the shoes and having longitudinal guide ribs cooperating with guide ribs on the inner wall of the casing, an axial rod anchored to the follower and extending into the casing, a nut threaded upon the inner end of the rod, a spring seat bearing outwardly against the shoes, a spring reacting between the seat and the nut and a helical spring reacting between the casing flange and the follower.

3. In a cushioning device, in combination, a cylindrical casing having a lateral flange at one end and being inwardly tapered from its opposite end, segmental friction shoes engaging the tapered walls and having outwardly facing wedge surfaces on their inner faces, a follower having wedge faces cooperating with the wedge surfaces of the shoes, means for preventing relative turning movement of the follower and casing, an axial rod anchored to the follower and extending into the casing, a nut threaded upon the inner end of the rod, a spring seat bearing outwardly against the shoes, a spring reacting between the seat and the nut, and a helical spring reacting between the casing flange and the follower.

DONALD F. SPROUL.